United States Patent
Kayama et al.

(10) Patent No.: US 8,218,413 B2
(45) Date of Patent: Jul. 10, 2012

(54) OPTICAL DISC DRIVE

(75) Inventors: Hiroshi Kayama, Osaka (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/984,715

(22) Filed: Jan. 5, 2011

(65) Prior Publication Data

US 2011/0170384 A1    Jul. 14, 2011

(30) Foreign Application Priority Data

Jan. 8, 2010    (JP) .................................. 2010-002518

(51) Int. Cl.
*G11B 7/00* (2006.01)

(52) U.S. Cl. ................ 369/59.24; 369/44.26; 369/275.4

(58) Field of Classification Search ............... 369/275.4, 369/275.3, 59.23–59.25, 53.2, 47.22, 13.54, 369/30.12, 44.26

See application file for complete search history.

(56) References Cited

U.S. PATENT DOCUMENTS

| | | | |
|---|---|---|---|
| 2002/0167888 A1* | 11/2002 | Kamioka et al. .......... 369/59.17 |
| 2003/0054128 A1* | 3/2003 | Sako et al. .................. 428/64.4 |
| 2004/0027980 A1* | 2/2004 | Sako et al. .................... 369/272 |
| 2004/0047252 A1* | 3/2004 | Miyatake et al. ........... 369/275.3 |
| 2005/0058028 A1* | 3/2005 | Aoyama et al. ............ 369/275.4 |
| 2005/0128905 A1* | 6/2005 | Sako et al. .................. 369/47.22 |
| 2006/0114809 A1* | 6/2006 | Hosokawa ................. 369/275.1 |
| 2010/0220567 A1* | 9/2010 | Tajima et al. .............. 369/275.4 |

FOREIGN PATENT DOCUMENTS

JP   57-181429   11/1982

OTHER PUBLICATIONS

Co-pending U.S. Appl. No. 13/201,665, filed Aug. 16, 2011.
Co-pending U.S. Appl. No. 12/983,963, filed Jan. 4, 2011.
Co-pending U.S. Appl. No. 12/984,721, filed Jan. 5, 2011.

* cited by examiner

*Primary Examiner* — Thang Tran
(74) *Attorney, Agent, or Firm* — Renner, Otto, Boisselle & Sklar, LLP

(57) ABSTRACT

An optical disc drive according to the present invention writes information on an optical disc, which includes a substrate on which a number of pre-pits have been formed on its tracks and a recording film that is supported on the substrate. The optical disc drive includes a writing control section for instructing an optical pickup to record marks on the tracks by irradiating the recording film with a writing light beam. In accordance with information that defines, on the tracks, recordable areas Aa1 through Aa4 where the marks are recordable and pre-pit reading areas Ab1 through Ab4 where no marks are recordable, the writing control section controls the optical pickup so that the marks are recorded on at least some of the recordable areas. On the tracks on which the marks are recorded, each recordable area is shorter than any of the pre-pit reading areas.

9 Claims, 13 Drawing Sheets

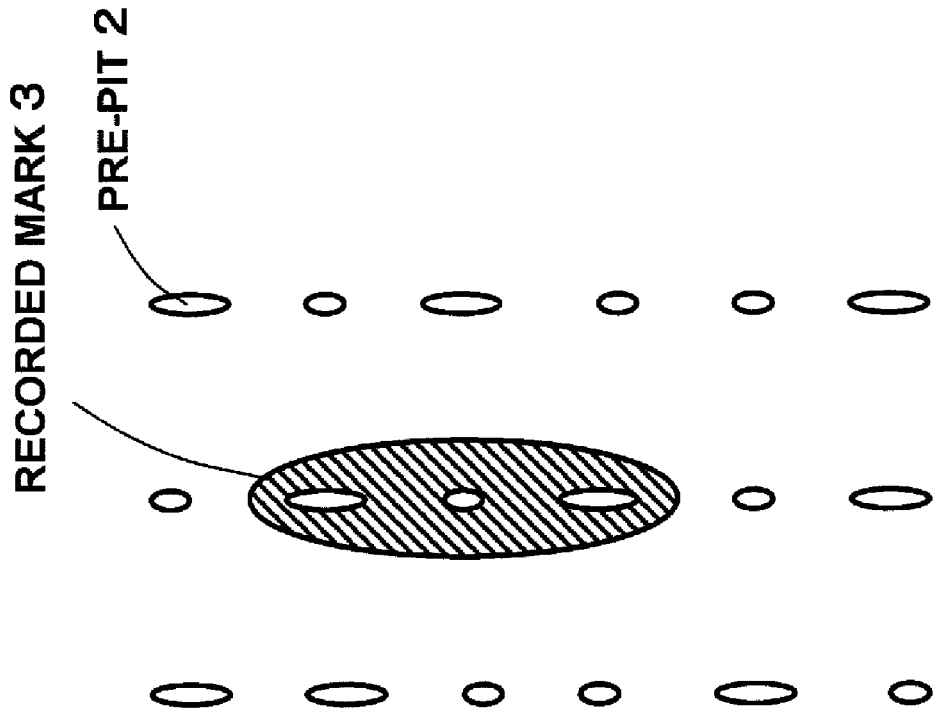

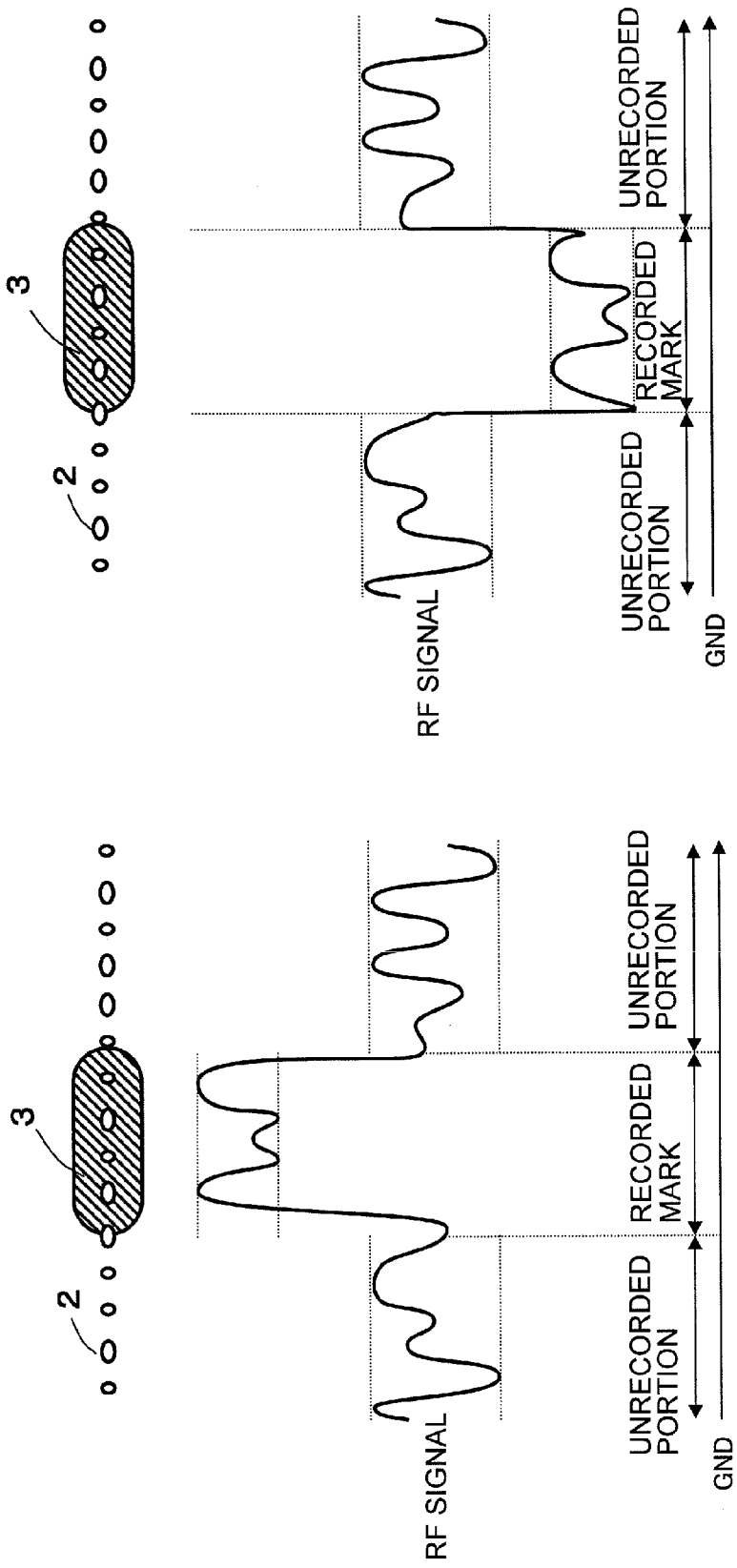

# OPTICAL DISC DRIVE

BACKGROUND OF THE INVENTION

1. Field of the Invention

The present invention relates to an optical disc drive that can write information on an optical disc.

2. Description of the Related Art

In optical disc technologies, data can be read out from a rotating optical disc by irradiating the disc with a relatively weak light beam with a constant intensity and detecting the light that has been modulated by, and reflected from, the optical disc. On a read-only optical disc, information is already stored as pre-pits that are arranged either concentrically or spirally during the manufacturing process of the optical disc. On the other hand, on a rewritable optical disc, a recording material film, from/on which data can be read and written optically, is deposited by evaporation process, for example, on the surface of a substrate on which concentric or spiral grooves are arranged. In writing data on a rewritable optical disc, data is written there by irradiating the optical disc with a pulsed light beam, of which the optical power has been changed according to the data to be written, and locally changing the property of the recording material film.

In a recordable or rewritable optical disc, when data is going to be written on its recording material film, the recording material film is irradiated with such a light beam, of which the optical power has been modulated as described above, thereby recording an amorphous mark on a crystalline recording material film. Such an amorphous recorded mark is left there by heating a portion of the recording material film that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the optical power of the light beam for writing data (i.e., optical recording power) had an inappropriate level, then the recorded mark would have a deformed shape and sometimes it could be difficult to read the data as intended.

To read data that is stored on an optical disc or to write data on a rewritable optical disc, the light beam always needs to maintain a predetermined converging state on a target track. For that purpose, a "focus control" and a "tracking control" need to be done. The "focus control" means controlling the position of an objective lens along a normal to the surface of the optical disc (such a direction will sometimes be referred to herein as "optical disc depth direction") so that the focal point (or at least the converging point) of the light beam is always located on the target track. On the other hand, the "tracking control" means controlling the position of the objective lens along the radius of a given optical disc (which direction will be referred to herein as a "disc radial direction") so that the light beam spot is always located right on the target track.

In order to perform such a focus control or a tracking control, the focus error or the tracking error needs to be detected based on the light that has been reflected from the optical disc and the position of the light beam spot needs to be adjusted so as to reduce the error as much as possible. The magnitudes of the focus error and the tracking error are respectively represented by a "focus error (FE) signal" and a "tracking error (TE) signal", both of which are generated based on the light that has been reflected from the optical disc.

Japanese Patent Application Laid-Open Publication No. 57-181429 (which will be referred to herein as "Patent Document No. 1") discloses an optical disc drive that writes information between pre-pits on an optical disc in order to increase the data1 storage capacity of the optical disc.

The optical disc drive disclosed in Patent Document No. 1 records a huge number of marks between the multiple pre-pits that are arranged on the tracks of an optical disc. However, since the area in which each of those marks is recorded is longer than any of those pre-pits, the PLL control could not get done with stability during reading. As a result, a tracking error generated might prevent the drive from retrieving the added information appropriately.

Generally speaking, it is an important task for an optical disc drive to retrieve stored information with as high quality as possible.

It is therefore an object of the present invention to provide an optical disc drive that can scan recorded marks with more stability even if the marks have been recorded on an optical disc on which pre-pits have already been formed.

SUMMARY OF THE INVENTION

An optical disc drive according to the present invention can write information on an optical disc, which includes a substrate on which a number of pre-pits have been formed on its tracks and a recording film that is supported on the substrate. The optical disc drive includes an optical pickup, and a writing control section for instructing the optical pickup to record marks on the tracks by irradiating the recording film with a writing light beam. In accordance with information that defines, on the tracks, recordable areas where the marks are recordable and pre-pit reading areas where no marks are recordable, the writing control section controls the optical pickup so that the marks are recorded on at least some of the recordable areas. On the tracks on which the marks are recorded, each recordable area is shorter than any of the pre-pit reading areas.

In one preferred embodiment, the optical disc drive further includes a memory, in which the information that defines the recordable areas and the pre-pit reading areas is stored.

In another preferred embodiment, the recordable areas are defined to overlap with some the pre-pits.

In still another preferred embodiment, on the tracks of the optical disc, an area with pre-pits alternates with an area with no pre-pits, and the recordable areas are defined in the areas with no pre-pits.

In this particular preferred embodiment, the writing control section instructs the optical pickup to record marks on the areas with no pre-pits.

In an alternative preferred embodiment, the writing control section makes the optical pickup record the marks so that a signal representing the pre-pits and a signal representing the recorded marks fall within the same frequency range.

In another alternative preferred embodiment, guide grooves have been cut in the areas with no pre-pits on the optical disc.

In yet another preferred embodiment, the optical disc drive includes a tracking control section for performing a tracking control based on the information that is provided by the pre-pits and included in a signal representing reflected light that has been detected by the optical pickup.

In a specific preferred embodiment, while the marks are being recorded, the tracking control section performs a tracking control based on the information that is provided by the pre-pits and included in the signal representing the reflected light that has been detected by the optical pickup.

When marks need to be recorded on an optical disc on which pre-pits have already been formed, the optical disc drive of the present invention can scan the recorded marks with even more stability.

BRIEF DESCRIPTION OF THE DRAWINGS

FIG. 5C illustrates where a recorded mark may be located with respect to the pre-pits that have been formed on the optical disc of the first preferred embodiment.

FIG. 7A shows what waveform an RF signal may have while a mark is being recorded on the optical disc of the first preferred embodiment.

FIG. 7B shows how the waveform of the RF signal may change once a mark has been recorded on the optical disc of the first preferred embodiment.

DETAILED DESCRIPTION OF PREFERRED EMBODIMENTS

Hereinafter, preferred embodiments of an optical disc drive according to the present invention will be described with reference to the accompanying drawings. In the following description, an area on a track of an optical disc where the optical disc drive can record a mark will be referred to herein as a "recordable area", while an area on the same track where no marks can be recorded will be referred to herein as a "pre-pit reading area". The recordable area can be specified by the optical disc drive.

(Embodiment1)

A first specific preferred embodiment of the present invention will now be described.

1. Configuration of the First Preferred Embodiment 1.1. Optical Disc Drive's Arrangement (FIG. 1)

First of all, an exemplary arrangement for an optical disc drive 500 as a first preferred embodiment of the present invention will be described with reference to FIG. 1. The optical disc drive may be used in personal computers, optical disc players, optical disc recorders and other devices that use an optical disc.

Figure 1:
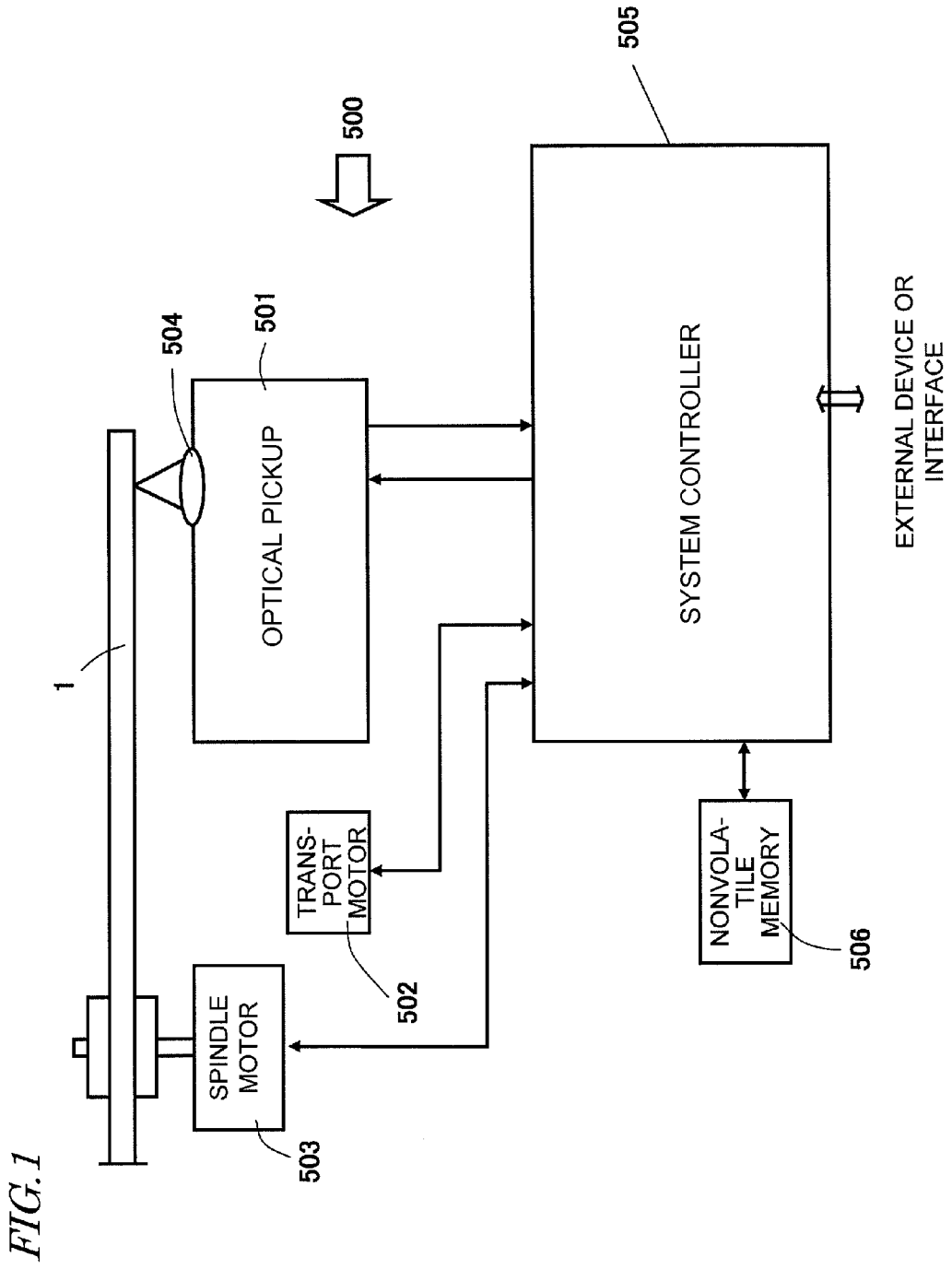
FIG. 1 is a block diagram illustrating an exemplary arrangement for an optical disc drive according to a first preferred embodiment of the present invention.

FIG. 1 is a block diagram illustrating an exemplary arrangement for the optical disc drive 500. As shown in FIG. 1, the optical disc drive 500 includes an optical pickup 501, a spindle motor 503 for rotating a given optical disc 1, a transport motor 502 for controlling the position of the optical pickup 501, a system controller 505 for controlling the operations of all of these components, and a nonvolatile memory 506.

Data is optically read out from the optical disc 1, and photoelectrically converted by the photodetector (not shown) of the optical pickup 501 into an electrical signal, which is then passed to the system controller 505. The optical pickup 501 includes a light source (such as a semiconductor laser diode) for emitting a light beam, an objective lens 504 for condensing the light beam and forming a light beam spot on the optical disc 1, an actuator for driving the objective lens 504, and other known members.

Based on the electrical signal provided by the optical pickup 501, the system controller 505 generates servo signals including a focus error (FE) signal and a tracking error (TE) signal, and performs various kinds of analog signal processing such as waveform equalization on the read signal, binarization/slicing, and data synchronization.

By using those servo signals generated, the system controller 505 makes the light beam spot, which is formed by the optical pickup 501 on the optical disc 1, follow the target track on the rotating optical disc 1. The system controller 505 gets a series of control operations, including focus and tracking controls using the objective lens 504 of the optical pickup 501, an optical pickup transport control, and a control of the spindle motor, done as digital servo operations. That is to say, the system controller 505 contributes to driving appropriately the actuator (not shown) of the objective lens 504, the transport motor 502 that moves the optical pickup 501 either inward or outward with respect to the optical disc 1, and the spindle motor 503 that rotates the optical disc 1. It should be noted that the system controller 505 could be implemented as a semiconductor IC.

The nonvolatile memory 506 stores a software program to be executed by the system controller 505, various parameters, and other sorts of information. Also stored in the nonvolatile memory 506 is information that defines, on the tracks of the optical disc 1, recordable areas where the marks 3 are recordable and unrecordable areas where no marks 3 are recordable. Such information will be referred to herein as "storage area information". In the unrecordable areas, only pre-pits are formed and no marks are recordable. Thus, the unrecordable areas will be referred to herein as "pre-pit reading areas". In this preferred embodiment, the storage area information defines specifically at which addresses on the optical disc 1 those recordable and pre-pit reading areas are located. However, the storage area information may also be any other kind of information as long as the information defines exactly where on the tracks of the optical disc 1 the recordable areas are located.

Figure 2:
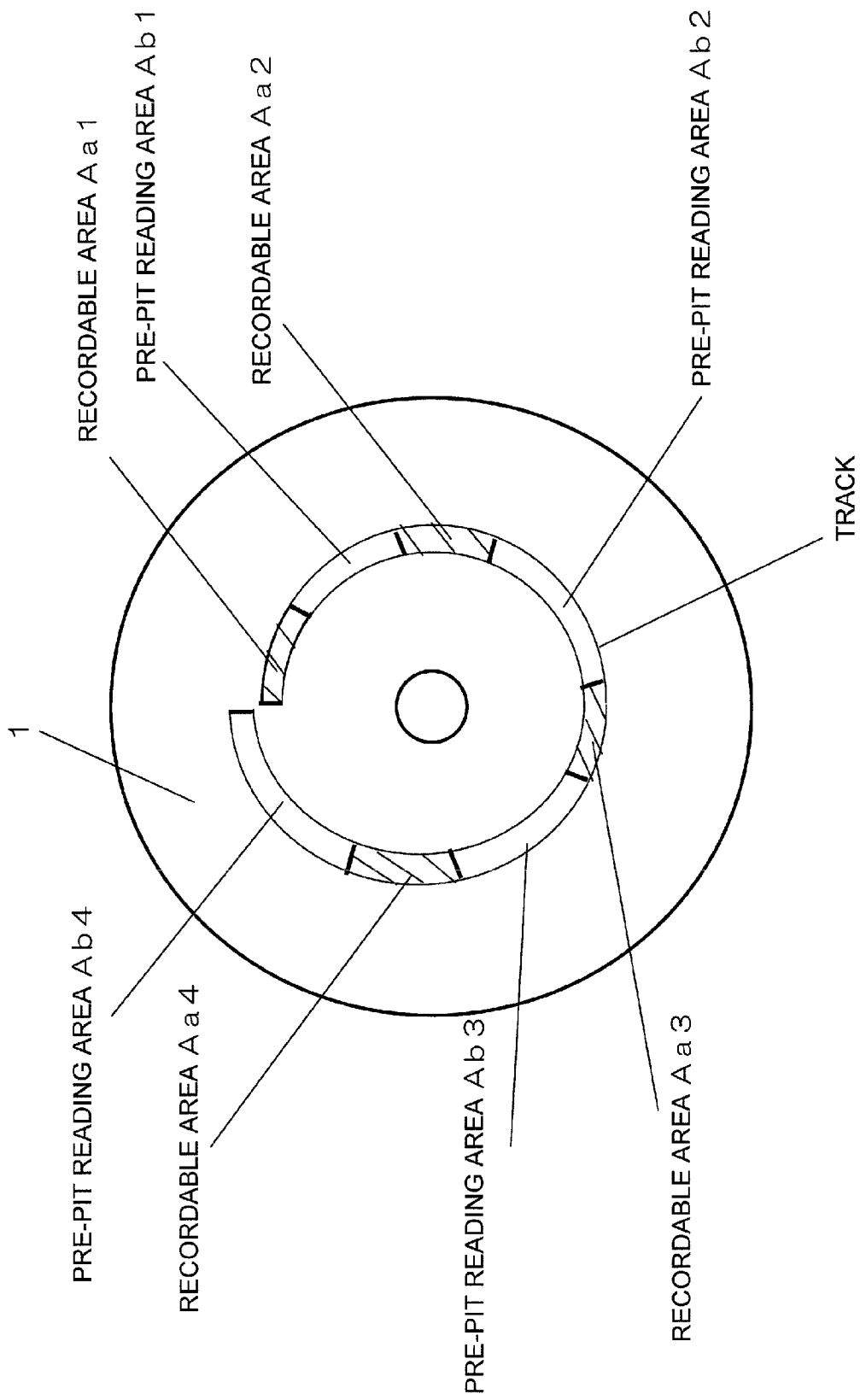
FIG. 2 illustrates an exemplary arrangement of recordable areas and pre-pit reading areas on an optical disc according to the first preferred embodiment.

FIG. 2 schematically illustrates an exemplary arrangement of recordable areas and pre-pit reading areas on a single track of the optical disc 1. In the example illustrated in FIG. 2, areas Aa1, Aa2, Aa3 and Aa4 are defined as recordable areas. In that case, marks can be recorded only within those recordable areas Aa1, Aa2, Aa3 and Aa4 and no marks can be recorded in any of the pre-pit reading areas Ab1, Ab2, Ab3 and Ab4. It should be noted that even in a recordable area, marks are not always recorded. Rather, depending on what kind of data needs to be written there, some portions of a single recordable area may have recorded marks but other portions thereof may have no recorded marks. The process of recording a mark on a recordable area will be described in detail later.

Each recordable area is defined to cover a narrower range than any pre-pit reading area. In other words, on each track on which marks are going to be recorded, the length of each recordable area is defined to be shorter than that of any of the pre-pit reading areas.

According to this preferred embodiment, the recordable areas are dispersed so that each of those recordable areas is interposed between two pre-pit reading areas as shown in FIG. 2. With such an arrangement, signals can be read with good stability. And by adopting such an arrangement, pre-pit reading areas with only the pre-pits and recordable areas, on which not just pre-pits but also marks can be recorded, alternate with one another on the optical disc.

As for areas with only pre-pits, only a signal representing the pre-pits is obtained, and therefore, a PLL control can get done with good stability. As for areas on which both pre-pits and marks have been recorded, on the other hand, not just a pre-pit signal but also a recorded mark signal have been superposed one upon the other in the signal obtained, and therefore, sometimes the PLL control cannot get done with stability. In that case, if a recorded mark covered a long range on a track, then the PLL control would lose stability so much as to generate a tracking error and other errors.

According to this preferred embodiment, however, each recordable area is interposed between two pre-pit reading areas, and defined to be shorter in length than any pre-pit reading area. That is why if a PLL control on those reading areas can be stabilized, the PLL control on those recordable areas can also be stabilized. Consequently, the optical disc drive 500 of this preferred embodiment can overcome the problem with a PLL control on the recordable areas that would lose its stability during reading.

In other words, when a signal is read out from a recordable area after a signal has been read out from a reading area, the signal can start to be read from the recordable area according to this preferred embodiment with the PLL control stabilized. As a result, a PLL control on the recordable area can also get done with more stability.

On top of that, according to the writing method (i.e., the method of recording a mark on pre-pits) according to this preferred embodiment, the RF signal can be obtained (and a TE signal can also be detected) from the pre-pits during writing. As a result, the PLL control can also get done using the pre-pits even during writing. Consequently, the signal representing a mark that has been recorded on a recordable area can have improved quality.

1.2. Optical Disc's Structure (FIGS. 3, 4, 5a, 5b and 5c)

Next, the structure of the optical disc 1 will be described with reference to FIGS. 3, 4, 5A, 5B and 5C.

Figure 3:
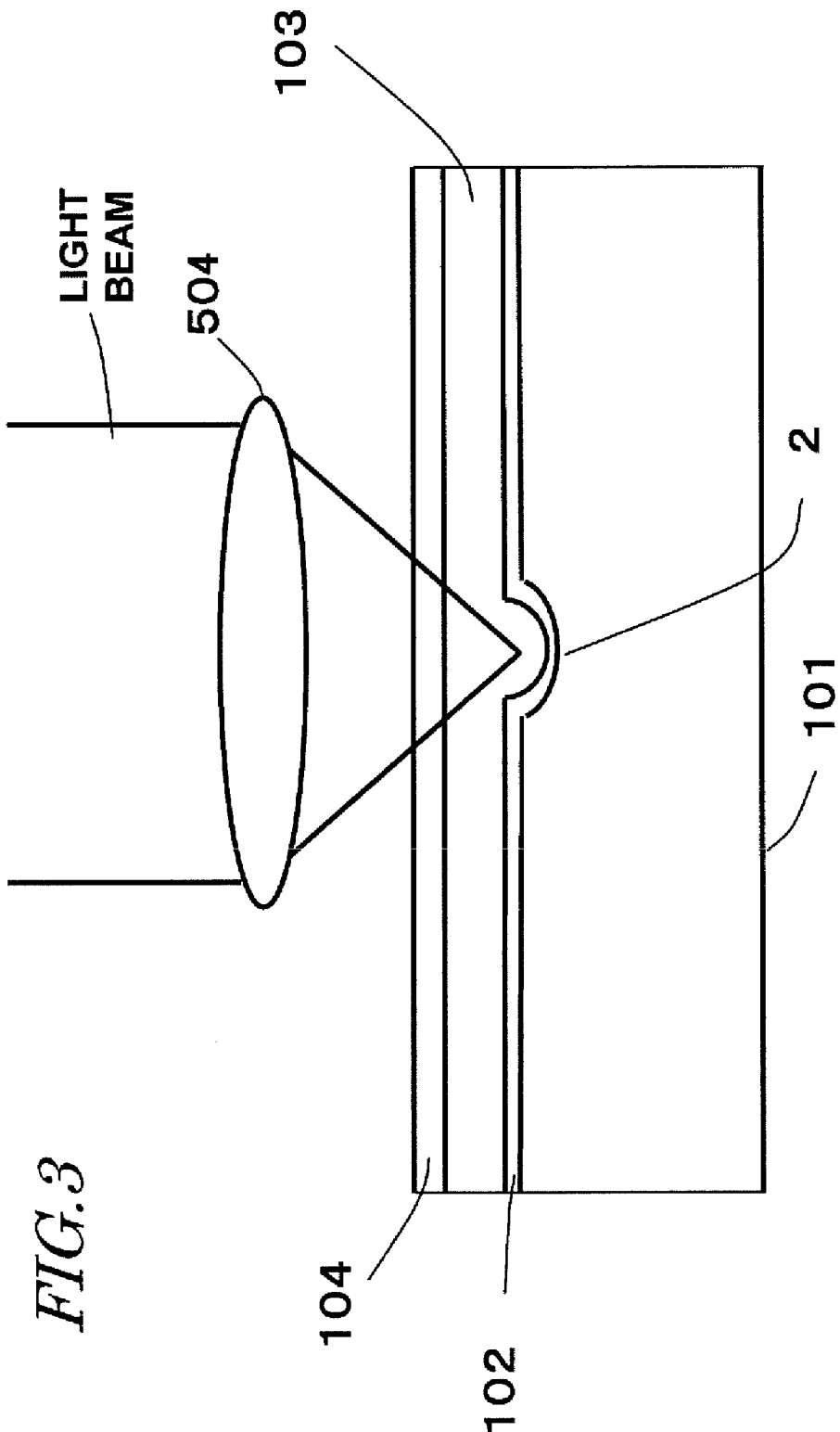
FIG. 3 is a cross-sectional view of an optical disc according to the first preferred embodiment.

FIG. 3 schematically illustrates a part of a cross section of the optical disc 1. As shown in FIG. 3, the optical disc 1 includes a substrate 101, of which the principal surface has a pre-pit 2, and a multilayer structure, which is supported on the principal surface of the substrate 101. The multilayer structure of this preferred embodiment includes a recording film 102, a protective film 103, and a hard coating 104, which are stacked in this order on the substrate 101.

In writing data on the optical disc 1 by performing a write-once operation, the optical disc drive 500 shown in FIG. 1 has the recording film 102 irradiated with a light beam, which has been emitted by the optical pickup 501 and then transmitted through the hard coating 104, thereby recording a mark 3 on the recording film 102.

The substrate 101 forms the supporting base of the optical disc 1. Although only one pre-pit 2 is illustrated in FIG. 3, a huge number of pre-pits 2 are actually formed on the principal surface of the substrate 101, on which the recording film 102 is deposited. Those pre-pits 2 are physical dents or projections on the principal surface of the substrate 101 and are made in the process step of forming the substrate 101 during the manufacturing process of the optical disc 1. Such a substrate 101 having those pre-pits 2 on its surface may be formed by a known process for manufacturing a BD-ROM.

If the wavelength of the light beam to emit is represented by $\lambda$, the depth of the pre-pits 2 may fall within the range of $\lambda/7$ through $\lambda/4$. For example, if $\lambda \approx 405$ nm, the pre-pits 2 typically have a depth of approximately 60-100 nm (i.e., approximately 0.06 μm through 0.1 μm). The length of the pre-pits 2 as measured in the tracking direction may be from one through several times as large as 0.15 μm.

Figure 4:
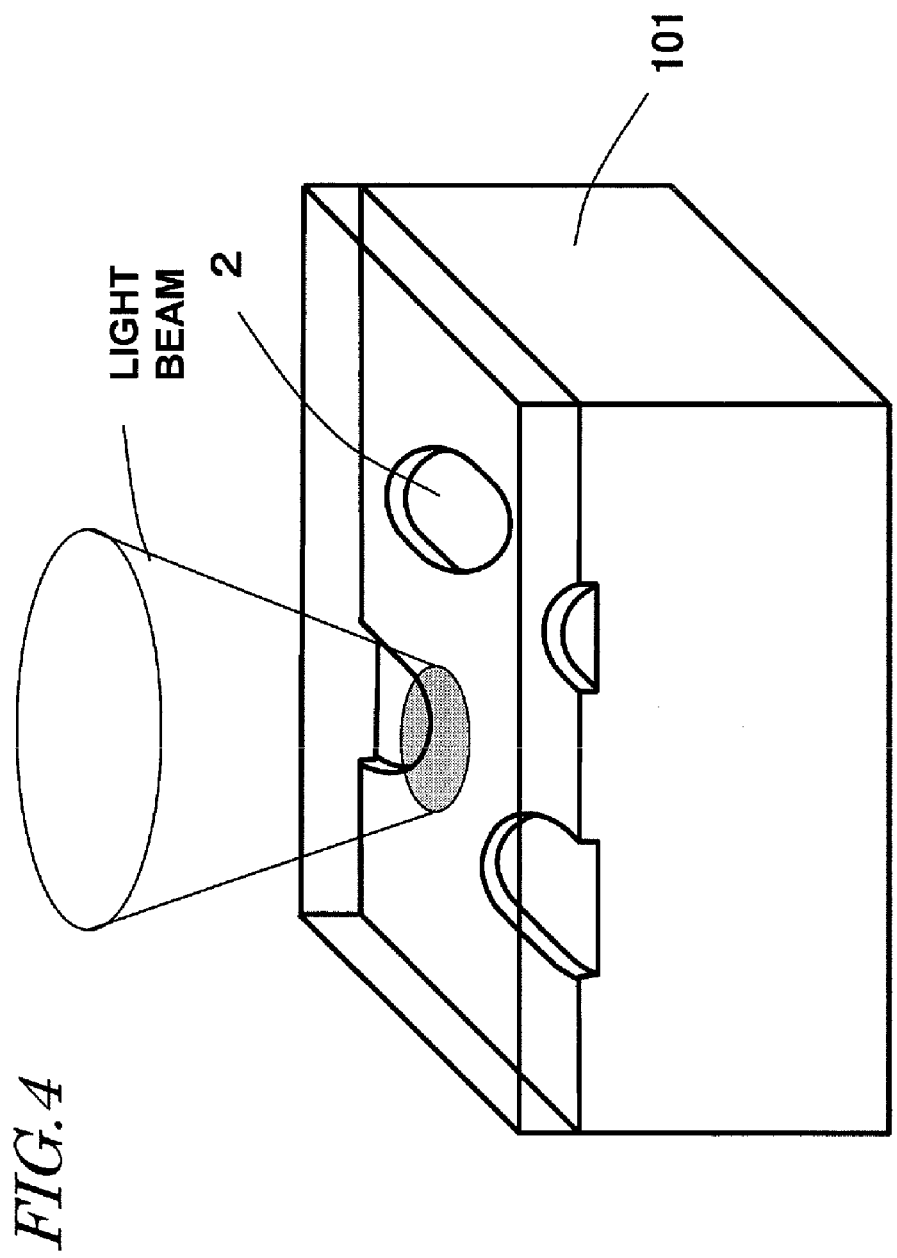
FIG. 4 is a perspective view illustrating some pre-pits of the optical disc according to the first preferred embodiment.

As shown in FIG. 4, the pre-pits 2 that have been made on the optical disc 1 of this preferred embodiment are "in-pits", which are depressed with respect to the light incident surface. Conversely, "on-pits" are raised with respect to the light incident surface. Although the pre-pits 2 are dents on the light incident surface of the substrate 101 in the example illustrated in FIGS. 3 and 4, pre-pits 2 may also be projections in another example.

The substrate 101 may be made of polycarbonate, for example. The pre-pits 2 are arranged either concentrically or spirally to form tracks. In other words, a chain of pre-pits 2 has been formed on the tracks. By leaving those pre-pits 2, non-rewritable data is recorded on the substrate 101 as early as in its manufacturing process. The principal surface of the substrate 101 with those pre-pits 2 functions as a read-only information storage plane (which will be referred to herein as a "ROM plane"). The optical disc 1 for use in this preferred embodiment also has a recording film 102, which contacts with the ROM plane.

When the optical disc drive 500 shown in FIG. 1 starts to operate by being loaded with the optical disc 1, the recording film 102 is irradiated with the light beam that has been emitted from the optical pickup 501. Specifically, the light beam is condensed by the objective lens 504 onto the recording film 102, thereby forming a light beam spot on the recording film 102. As the optical disc 1 rotates, the light beam spot moves on the optical disc in its rotating direction. When information is added to the recording film 102, the recording film 102 is irradiated with sufficiently intense light. As a result, that irradiated portion of the recording film 102 has its optical properties changed in terms of reflectance, transmittance and phase difference.

A portion of the recording film 102, of which the optical properties have changed due to the exposure to the writing light beam, will serve as a recorded mark 3. By recording a number of marks 3 along the tracks, information can be written on (i.e., data can be added to) the recording film 102. A portion of one track that is located between two adjacent recorded marks 3 on the same track will be referred to herein as a "space". The overall arrangement of the recorded marks 3 and the spaces with various lengths is determined by what kind of information is going to be written. In other words, each of those recorded marks 3 has a length that is selected from a number of different lengths. If a track with the recorded marks 3 and spaces is scanned with a scanning light beam, the intensity of the reflected light (which will be referred to herein as a "reading light beam") varies between the recorded marks 3 and the spaces. And by detecting the intensity of the reading light beam, the information that has been written on the recording film 102 (i.e., the added information) can be read out. Since the intensity of the reading light beam will vary at radio frequencies, the read signal is often called an "RF Signal".

When the information added to the recording film 102 is read, the recording film 102 is irradiated with a relatively weak light beam that has been emitted from the optical pickup. The recording film 102 that can be used effectively in this preferred embodiment can reflect that weak light even if the recording film 102 has no special reflective layer. That is to say, the recording film 102 functions as not just a recording film but also a reflective film as well. The recording film 102 may be made of a phase change material such as Ge, Sb, Te, In or Ag. With the recording film 102 of such a phase change material, the recorded marks can be rewritten. Alternatively, the recording film 102 may also be made of an inorganic or organic material such as Te, Pd, 0, Cu, Ge, Bi or N. Once recorded on a recording film 102 made of such a material, a mark is no longer rewritable. Still alternatively, the recording film 102 may also be a metallic film of Al or Ag, for example. If such a metallic film is irradiated with intense light, holes can be cut through the metallic film. And those holes correspond to the recorded marks.

The protective film 103 protects the recording film 102 and may be made of a resin material, for example. The hard coating 104 is provided to reduce scratches or dirt that would otherwise do damage on the recording film 102 or the protective film 103 externally, and may be made of $SiO_2$ particles and a lubricant, for instance.

In this preferred embodiment, the recording film 102 does contact with the surface of the substrate 101 with the pre-pits 2 (i.e., the principal surface). However, another film or layer may be interposed between the principal surface of the substrate 101 and the recording film 102. In any case, however, the optical disc 1 is preferably designed so that the reflected light produced when the light beam emitted from the optical pickup is focused on the recording film 102 has its intensity changed depending on whether there is a pre-pit 2 there or not. The point is that in a preferred embodiment of the present invention, when information is written as a recorded mark 3 on the recording film 102 or when information is retrieved from the mark 3 that has been recorded on the recording film 102, the tracking error signal should be generated using the pre-pits 2. For that reason, such a film or layer to be interposed, if any, between the principal surface of the substrate 101 and the recording film 102 preferably has a thickness of at most 0.5 μm. Optionally, in another preferred embodiment of the present invention, information may not be retrieved from the pre-pits 2 and from the recorded marks 3 at the same time. In that case, there may be an interval of more than 0.5 μm between the principal surface of the substrate 101 and the recording film 102.

According to this preferred embodiment, both the tracking control to get done when information is retrieved from the pre-pits 2 of the optical disc 1 and the tracking control to get done when information is written as a recorded mark 3 onto the optical disc 1 and when information is read from the recorded mark 3 can be carried out using the same tracking error signal. As a result, a tracking error signal generating section for generating the tracking error signal can have its configuration significantly simplified. Specifically, since the tracking error signal generating section can be implemented as a single quadruple photodetector, the optical pickup can be made at a reduced cost according to this preferred embodiment.

Figure 5B:
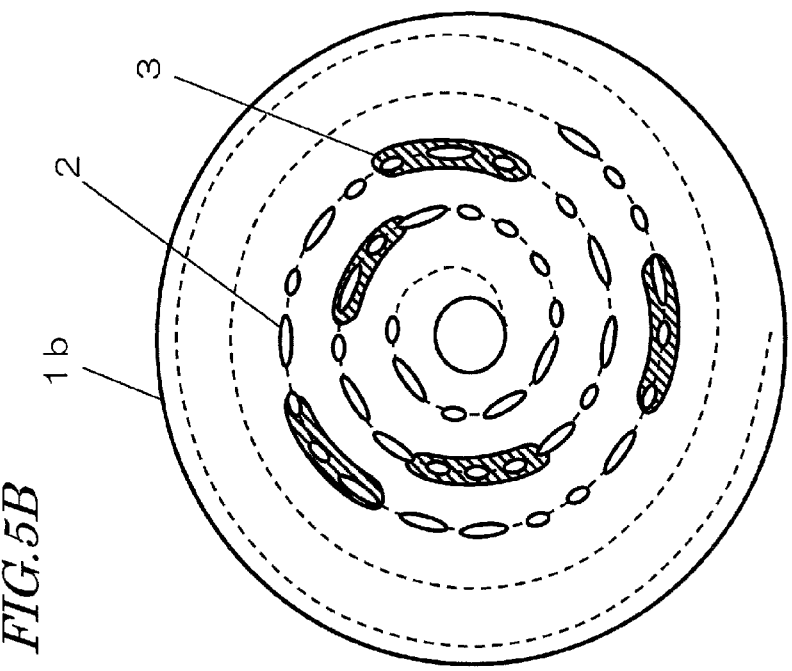
FIG. 5B is a plan view illustrating how the optical disc of the first preferred embodiment looks after marks have been recorded thereon.

Next, it will be described with reference to FIGS. 5A and 5B how the optical disc 1 changes before and after the marks 3 are recorded.

Figure 5A:
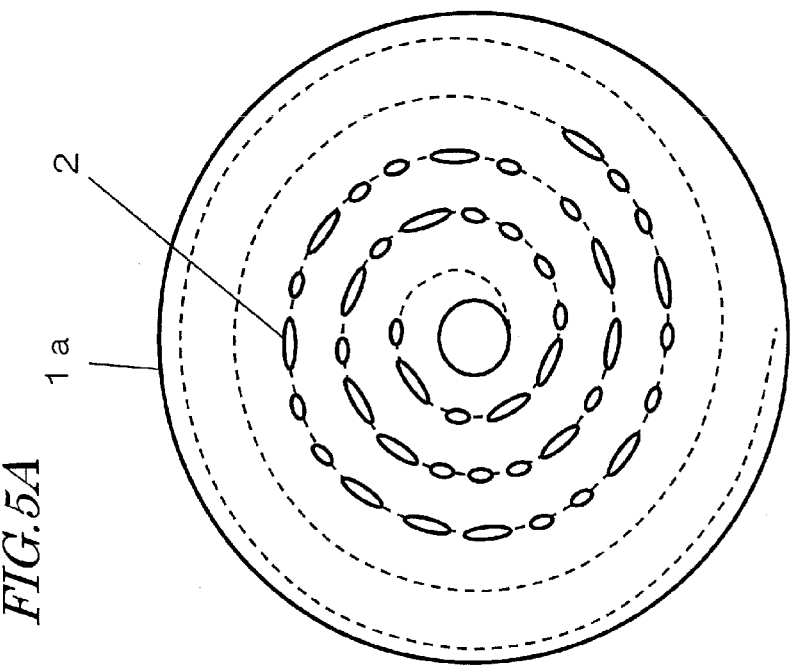
FIG. 5A is a plan view illustrating a status of an optical disc according to the first preferred embodiment on which no marks have been recorded yet.

FIG. 5A is a plan view illustrating the status of the optical disc 1a on which no marks 3 have been recorded yet. On this optical disc 1a, a concentric or spiral chain of pre-pits 2 has already been cut on the substrate 101 from its inner edge through its outer edge. FIG. 5B is a plan view illustrating how the optical disc 1b looks after marks 3 have been recorded thereon. In this optical disc 1b, the marks 3 have been recorded on the recording film 102 so as to overlap with the pre-pits 2.

FIG. 5C illustrates, on a larger scale, a part of an area on the optical disc 1 where a mark 3 has been recorded over some pre-pits 1 (i.e., an area with both the recorded mark 3 and the pre-pits 2). In FIG. 5C, the recorded mark 3 is illustrated as overlapping with only three pre-pits. However, this is only an example and the present invention is in no way limited to this specific preferred embodiment. In this case, even after the mark 3 has been recorded, these pre-pits 2 can still be scanned by (the optical pickup 501 of) the optical disc drive 500.

2. How Optical Disc Drive Works

2.1. Writing Control by System Controller 505

Hereinafter, it will be described how the system controller 505 performs a writing control when recording marks 3. In this preferred embodiment, the system controller 505 performs a writing control in accordance with the storage area information that is stored in the nonvolatile memory 506. It should be noted that according to this preferred embodiment, any number of marks may be recorded as long as those marks are located within the recordable areas. That is to say, sometimes no marks may be recorded in the recordable areas and sometimes multiple marks may be recorded there.

On receiving an instruction to record marks 3 from an external device, the system controller 505 records such marks 3 on the optical disc 1 in accordance with the instruction.

Figure 6:
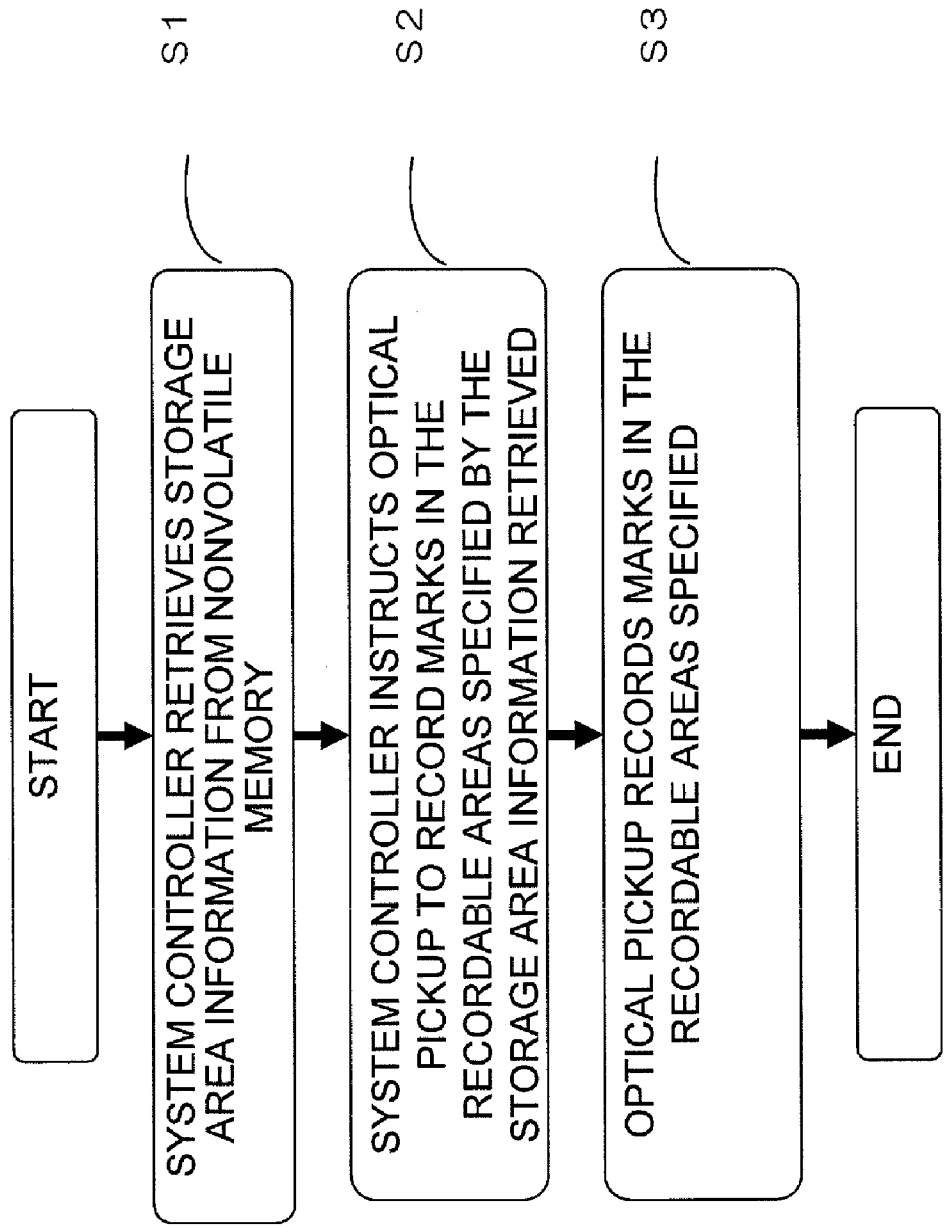
FIG. 6 is a flowchart showing a procedure in which the optical disc drive of the first preferred embodiment records a mark.

FIG. 6 is a flowchart showing the procedure in which the optical disc drive 500 of this preferred embodiment records a mark. First of all, the system controller 505 retrieves in Step S1 the storage area information from the nonvolatile memory 506. Next, in Step S2, the system controller 505 instructs the optical pickup 501 to record marks in the recordable areas that are specified by the storage area information that has been retrieved. In response, under the control of the system controller 505, the optical pickup 501 records marks 3 on the optical disc 1 in Step S3 as shown in FIG. 5B. Each of these marks 3 is recorded within an associated one of the recordable areas that are specified by the storage area information.

By performing these processing steps, the system controller 505 can record marks 3 within the predetermined range.

Hereinafter, it will be described in further detail how the optical disc drive 500 performs the write operation.

The focus control and the tracking control are carried out so that the light beam emitted from the optical pickup 501 is focused right on the pre-pits 2 on the optical disc 1 and that the light beam spot thereof follows the pre-pits 2 on the target track. In this preferred embodiment, the optical disc drive 500 performs the focus control by reference to the information about astigmatism that has been obtained based on the light reflected from the optical disc 1. Also, the optical disc drive 500 performs the tracking control based on the differential phase detection (which will be abbreviated herein as "DPD") information, which can be obtained from the pre-pits 2 and is included in the light reflected from the optical disc 1. A DPD signal is a tracking error signal that can be used effectively to follow a chain of pre-pits 2, which are deep enough to make the RF signal generated have sufficiently large amplitude. If the push-pull method is adopted, the tracking error signal has the largest amplitude when the pre-pits 2 have a depth of $\lambda/8$. However, an RF signal generated from such pre-pits 2 with a depth of $\lambda/8$ will have zero amplitude. On the other hand, an RF signal generated from pre-pits 2 with a depth of $\lambda/4$ will have the maximum amplitude but a push-pull tracking error signal generated from such pre-pits 2 with a depth of $\lambda/4$ will have a zero amplitude this time. For that reason, when a tracking control is performed on the series of pre-pits 2, a DPD tracking error signal is preferred to the push-pull tracking error signal.

If the pre-pits 2 are interposed between (guide) grooves, of which the depth (which may be $\lambda/8$) is different from that of the pre-pits 2 (which may be $\lambda/4$), a push-pull tracking error signal can be generated using those guide grooves. In this preferred embodiment, however, a DPD tracking error signal is used, and therefore, no such grooves are needed.

Hereinafter, it will be described with reference to FIG. 7A how to get the tracking control done while a mark is being recorded. According to this preferred embodiment, pre-pits 2 are located right under a position where a mark 3 is going to be recorded when viewed along a normal to the surface of the optical disc 1. That is why even if a mark 3 needs to be recorded on a track with no guide grooves, the optical disc drive 500 can also carry out a DPD tracking control using a pre-pit signal included in the light reflected from the optical disc 1. When no marks 3 are recorded, the light beam is emitted with a power that is high enough to produce a DPD signal to get the tracking control done. On the other hand, when marks 3 are recorded, the power of that light beam is temporarily raised. When irradiated with a light beam with such an increased power, the recording film 102 comes to have its optical properties locally changed, thus forming a recorded mark 3 there. According to this preferred embodiment, while a mark 3, which is much longer than a pre-pit 2, is going to be recorded, a single beam with long duration is emitted from the light source continuously, not in multiple pulses with short pulse widths, as described above. Suppose an optical power level that should be reached to record a mark 3 is identified by $P_{high}$ and an optical power level that should be maintained to generate a DPD signal even though no marks 3 need to be recorded is identified by $P_{low}$. In that case, the mark 3 is recorded while the optical power is raised from $P_{low}$ to $P_{high}$. Consequently, the mark 3 thus recorded will have a length that is proportional to the amount of time it has taken to raise the optical power level from $P_{low}$ to $P_{high}$.

According to a technique already known in the art, while a target track on an optical disc 1 is being irradiated with a writing light beam, another track, which is adjacent to the target one, is irradiated with a light beam to produce a tracking error signal (which will be referred to herein as a "sub-beam"). On the other hand, according to this preferred embodiment, even though the optical disc 1 is irradiated with a single beam, a mark 3 can be recorded right on the target track just as intended while a tracking error signal (DPD signal) is being produced.

In the example illustrated in FIG. 7A, while a mark 3 is being recorded, the light beam has a high optical power level, and therefore, the level of an RF signal representing the intensity of its reflected light is also high as a whole. That high-frequency portion of the RF signal waveform is produced by the pre-pits 2. Since a single recorded mark 3 overlaps with multiple pre-pits 2, such a high-frequency signal component representing those multiple pre-pits 2 is included as shown in FIG. 7A in the RF signal, representing the intensity of the reflected light, while the mark 3 is being recorded. As a result, while a mark 3 is being recorded, the pre-pit signal can be extracted from the RF signal representing the light reflected from the optical disc 1.

In this manner, the system controller 505 can obtain the signal from the pre-pits 2 while a mark 3 is being recorded. In other words, even while a mark 3 is being recorded, a DPD signal can also be obtained. For that reason, the optical disc drive 500 can record a mark 3 while getting the DPD tracking control done.

On top of that, just before starting a write operation, the system controller 505 can get a PLL established and generate a clock signal with good stability while reading information from the pre-pits 2 at the same time. A timing signal for recording can be generated by reference to that clock signal. And even while a mark 3 is being recorded, information can still be retrieved from the pre-pits 2 and a clock signal can be generated. As a result, the timing to emit the light beam, of which the power is high enough to record a mark, can be controlled accurately, and therefore, a mark 3 can be recorded with little jitter.

Next, it will be described what advantage will be achieved by performing the DPD tracking control. A normal optical pickup for writing splits the light into three beams on its way toward the disc, and provides three quadruple photodetectors for those three beams, respectively, thereby getting a DPD tracking control done. In this manner, the TE offset, which is produced by the objective lens that follows the rotating optical disc 1 with some eccentricity, can be canceled and the light beam spot can follow the guide grooves of the optical disc with good stability.

On the other hand, according to this preferred embodiment, the DPD tracking control can also be done even during writing, and therefore, only one quadruple photodetector needs to be provided. In other words, since the photodetector has a smaller overall size, the size, and eventually the price, of the optical disc 1 can be cut down as well. On top of that, as there is no need to split the light into three beams, no diffraction grating needs to be provided on the way toward the disc. This will also contribute to reducing the size and price of the optical disc 1. Moreover, since the light is not split into three beams, the light source can be used more efficiently with smaller power dissipated. Added to that, the light source can be used for longer hours, or even a light source that emits light with relatively low power can also be used.

2.2. Reading Control by System Controller 505

Hereinafter, it will be described how the system controller 505 performs a reading control on the optical disc 1. The system controller 505 can retrieve information from the optical disc 1 by controlling the optical pickup 501. In this preferred embodiment, the system controller 505 can detect both the recorded marks 3 and pre-pits 2 that have been left on the optical disc 1. And the system controller 505 generates a reference clock signal by performing a PLL control, thereby decoding information represented by the recorded marks 3 and pre-pits 2.

FIG. 7B illustrates an exemplary waveform of an RF signal to be obtained from a recorded portion on which a mark of one bit has been recorded and two unrecorded portions that respectively precede and follow that recorded portion. The level of the RF signal obtained from that portion with the recorded mark is lower than that of the RF signal obtained from the unrecorded portions. In FIG. 7A, the light beam has increased power when a mark is recorded. That is why even if the reflectance of the recorded mark is lower than that of the unrecorded portions, the RF signal obtained while the mark is being recorded still has a high level. While data is being read, on the other hand, the optical disc 1 is irradiated with a light beam with a relatively low constant power level. Consequently, the RF signal obtained from a recorded mark with decreased reflectance comes to have a low level as shown in FIG. 7B. Since there is such a difference in RF signal level between a recorded mark and unrecorded portions, the recorded mark can be detected easily just by sensing that difference. Meanwhile, by extracting high-frequency components from the RF signal, a signal representing the pre-pits 2 can also be detected.

(Embodiment2)

Hereinafter, a second preferred embodiment of the present invention will be described with reference to the accompanying drawings. As the optical disc drive 500 has the same configuration as its counterpart of the first preferred embodiment described above, the description thereof will be omitted herein. Thus, the following description of the second preferred embodiment will be focused on only differences from the first preferred embodiment.

1.1. Optical Disc's Structure (FIGS. 8a and 8b)

First of all, the structure of an optical disc 10 according to this preferred embodiment will be described with reference to FIGS. 8A and 8B. In this preferred embodiment, pre-pits 20 are arranged at regular intervals on the tracks of the optical disc 10. And those spaces with no pre-pits 20 are specified by the optical disc drive 500 to be recordable areas on which marks 3 can be recorded. According to this preferred embodiment, the length of each recordable area is also defined to be shorter than that of any pre-pit reading area.

Figure 8A:
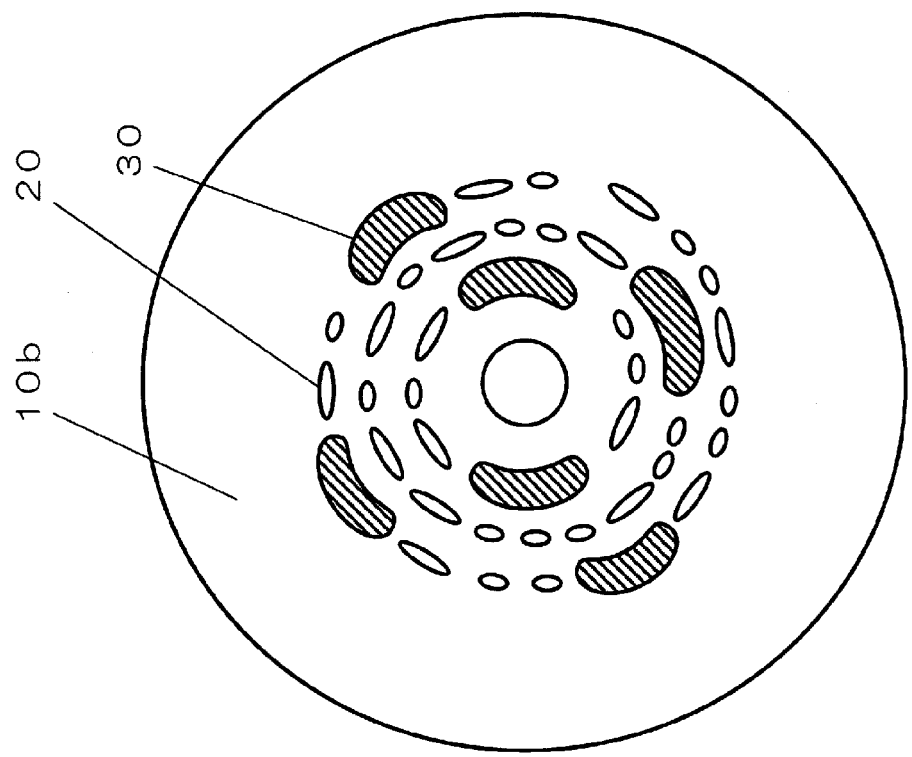
FIG. 8A is a plan view illustrating a status of an optical disc according to a second preferred embodiment of the present invention on which no marks have been recorded yet.

FIG. 8A schematically illustrates an optical disc according to this preferred embodiment on which no marks 30 have been recorded yet. As shown in FIG. 8A, on this optical disc 10a, pre-pits 20 are arranged spirally at regular intervals. Those spaces 40 with no pre-pits have no guide grooves, either.

Figure 8B:
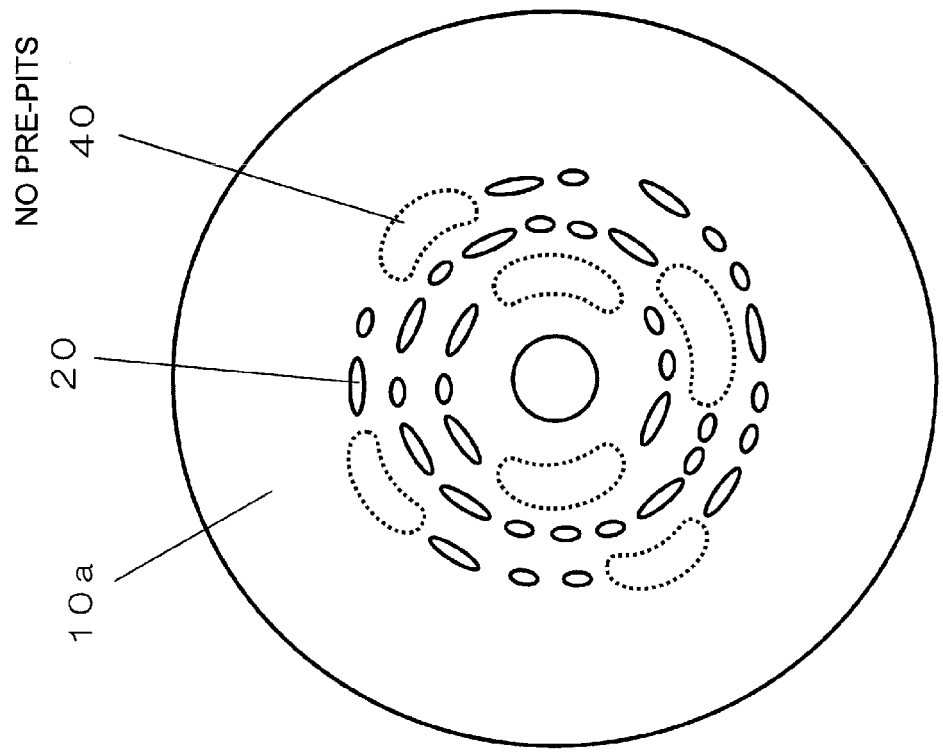
FIG. 8B is a plan view illustrating how the optical disc of the second preferred embodiment looks after marks have been recorded thereon.

FIG. 8B schematically illustrates an optical disc on which marks 30 have already been recorded. As shown in FIG. 8B, on this optical disc 10b, marks 30 have been recorded on the tracks on which the pre-pits 20 were formed. In accordance with the storage area information, the marks 30 have been recorded on the recordable areas. In the example illustrated in FIGS. 8A and 8B, all of those spaces 40 with no pre-pits are used as recordable areas without exception. However, the recordable areas may also be only some of those spaces with no pre-pits.

Figure 9:
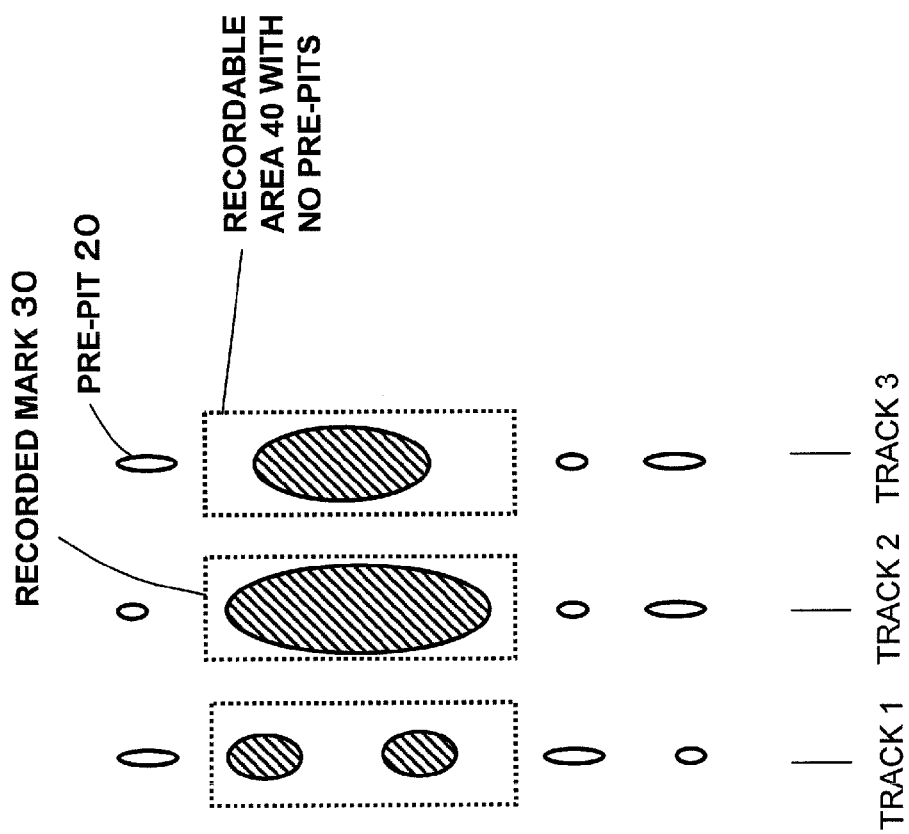
FIG. 9 illustrates where recorded marks may be located with respect to the pre-pits that have been formed on the optical disc of the second preferred embodiment.

FIG. 9 illustrates a part of the optical disc 10 on which marks 30 have been recorded on predetermined areas. In the example illustrated in FIG. 9, two marks have been recorded on the recordable area 40 on Track #1, while only one mark has been recorded on the recordable area 40 of each of Tracks #2 and #3. Also, the mark that has been recorded on Track #2 has a different length from the one recorded on Track #3. In this manner, the number and length of marks that can be recorded on one recordable area 40 may be different from one recordable area 40 to another.

It should be noted that the storage area information stored in the nonvolatile memory 506 defines the recordable areas 40 on the optical disc 10 by addresses. In this preferred embodiment, since those predetermined spaces to be recordable areas have no grooves or whatever, each recordable area is defined by the addresses of the areas that respectively precede and follow that recordable area.

2. How Optical Disc Drive Works

2.1. Writing Control by System Controller 505

Hereinafter, it will be described how the system controller 505 performs a writing control when recording marks 3.

On receiving an instruction from an external device, the system controller 505 starts performing the following operation in order to record a mark 30. In other words, the system controller 505 prepares to record a mark on the optical disc 10 in accordance with the external device's instruction accepted.

First of all, the system controller 505 generates a signal representing a mark to be recorded in accordance with the instruction. In this preferred embodiment, one-bit recording length of the recorded marks 30 has been defined and stored in advance in the nonvolatile memory 506. One-bit recording length of the recorded marks 30 is determined so that each recorded mark becomes approximately as long as any of the pre-pits 20 that have already been formed on the optical disc 10. That is to say, the signal representing the recorded marks 30 and the signal representing the pre-pits 20 both fall within the same frequency range. That is why the system controller 505 generates a write signal representing the mark 30 to be recorded based on the one-bit recording length of the recorded marks 30 that is stored in the nonvolatile memory 506. Also, the system controller 505 retrieves the storage area information from the nonvolatile memory 506. And the system controller 505 instructs the optical pickup 501 to record a mark 30 on the recordable area that has been specified by the storage area information retrieved.

Next, it will be described how the system controller 505 operates during writing.

Figure 10:
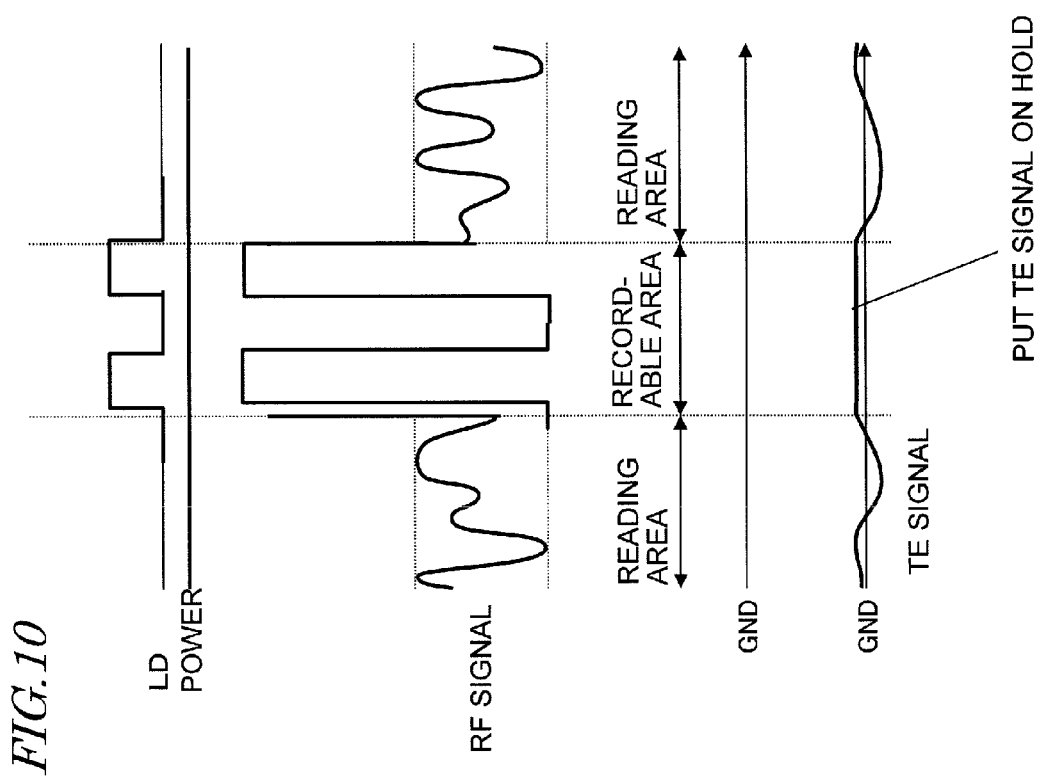
FIG. 10 shows how the waveform of a TE signal may change while a mark is being recorded on the optical disc of the second preferred embodiment.

Specifically, while making the optical pickup 501 record a mark 30, the system controller 505 controls the optical pickup 501 with the DPD tracking kept on hold (see FIG. 10).

In the optical disc with the structure shown in FIG. 9, for example, the recordable areas 40 have no guide grooves, and therefore, no tracking control signal can be obtained from the recordable areas 40. For that reason, when the light beam spot passes through the recordable area 40 while the optical disc 10 is rotating, the system controller 505 puts the tracking control on hold, thereby fixing the position of the light beam spot in the radial direction on the optical disc 1. In this manner, the tracking control can get stabilized.

2.2. Reading Control by System Controller 505

Hereinafter, it will be described how the system controller 505 performs a reading control on the optical disc 10. The system controller 505 can retrieve information from the optical disc 10 by controlling the optical pickup 501. In this preferred embodiment, the system controller 505 can detect both the recorded marks 30 and pre-pits 20 that have been left on the optical disc 10. Also, the recorded marks 30 and the pre-pits 20 can be read continuously because the pre-pits reading areas and recordable areas alternate with one another and because the recordable areas have no pre-pits at all.

According to this preferred embodiment, both the signal representing the marks 30 recorded and the signal representing the pre-pits 20 formed fall within the same frequency range, and therefore, can be decoded by the same signal reading block within the system controller 505. That is why if the recorded marks 30 and the pre-pits 20 are read continuously, decoding can be continued with the PLL control get done with stability (even in the boundary between the recorded marks 30 and the pre-pits 20). That is to say, both the recorded marks 30 and the pre-pits 20 can be decoded by the same signal reading block.

Furthermore, the system controller 505 can carry out the tracking control even without deciding whether the light beam spot is now passing through a recorded mark 30 or a pre-pit 20. In this preferred embodiment, it is also preferred that the tracking control be done by the DPD method.

According to this preferred embodiment, the recordable areas on which marks 30 have been recorded have no pre-pits 20 at all. For that reason, compared to the first preferred embodiment, the recorded marks 30 can be decoded with a better SNR (signal to noise ratio).

(Other Embodiments)

The present invention is in no way limited to the specific preferred embodiments described above but may be modified in numerous ways and may assume many embodiments other than those specifically described above.

Specifically, in the first preferred embodiment described above, the pre-pits 2 are supposed to be readable for (the optical pickup 501 of) the optical disc drive 500 even after the marks 3 have been recorded. However, this only an example of the present invention and no signal representing the pre-pits 2 may be obtained once the marks 3 have been recorded. In a situation where the information provided by the pre-pits 2 is not necessary anymore once the marks 3 have been recorded, there will be no problem even if the pre-pits 2 are no longer readable. The first preferred embodiment of the present invention may be modified in any other way as long as marks 3 can be recorded over the pre-pits 2.

Figure 11:
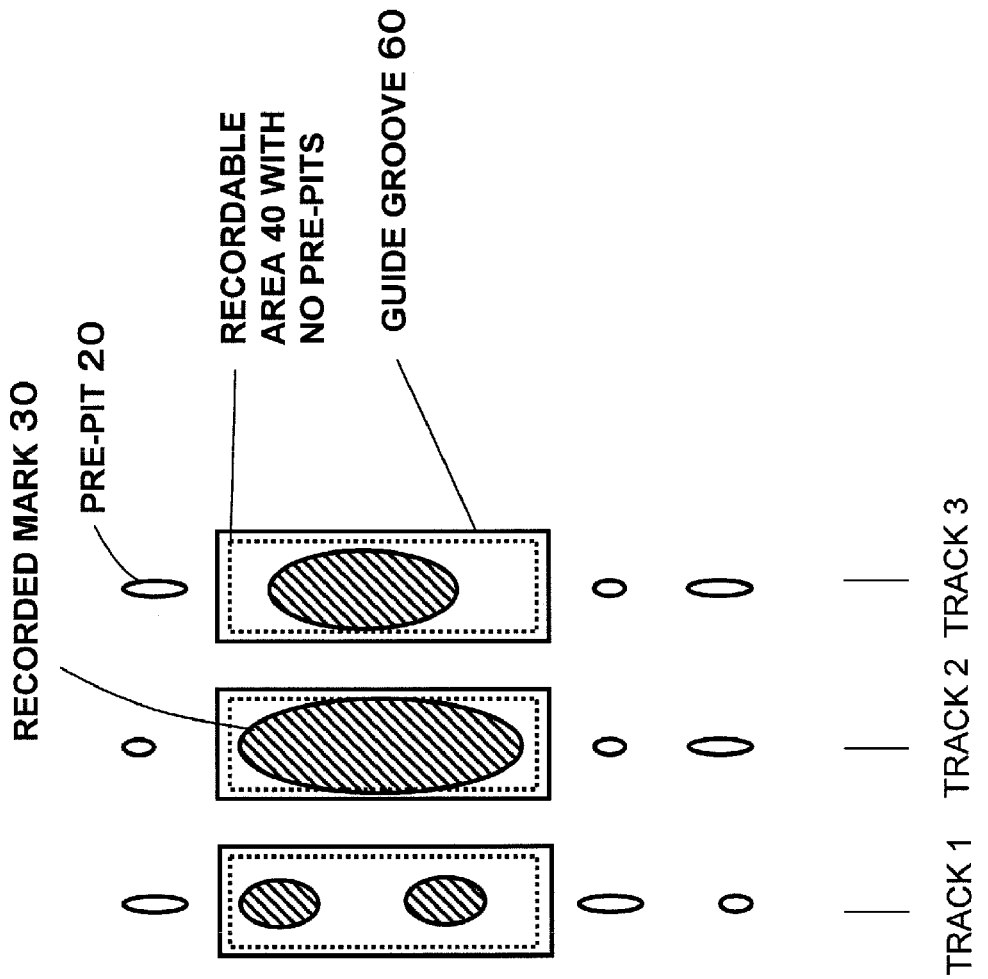
FIG. 11 illustrates where recorded marks may be located with respect to the pre-pits that have been formed on an optical disc according to a modified example of the second preferred embodiment.

On the other hand, in the optical disc 10 of the second preferred embodiment described above, recordable areas 40 (with no guide grooves) are supposed to be provided between the pre-pits 20. But this is just an example of the present invention, too, and guide grooves 60 may be provided for the recordable areas 40 as shown in FIG. 11. In that case, even if the tracking control cannot be performed with good stability just by putting the TE signal on hold (e.g., even if any recordable area 40 is rather long), such a mark 30 can also be recorded as intended by getting the tracking control done using the guide grooves during writing.

The storage area information is supposed to be stored in the nonvolatile memory 506 in the first and second preferred embodiments of the present invention described above, but may also be stored in any other storage medium. For example, the storage area information can also be stored as management information on an optical disc that has been loaded into the optical disc drive 500.

Furthermore, as long as the recordable areas on the optical disc are shorter than the pre-pits reading areas, each recordable area may have any other arbitrary length. For example, all of those recordable areas have the same length or mutually different lengths.

Figure 12:
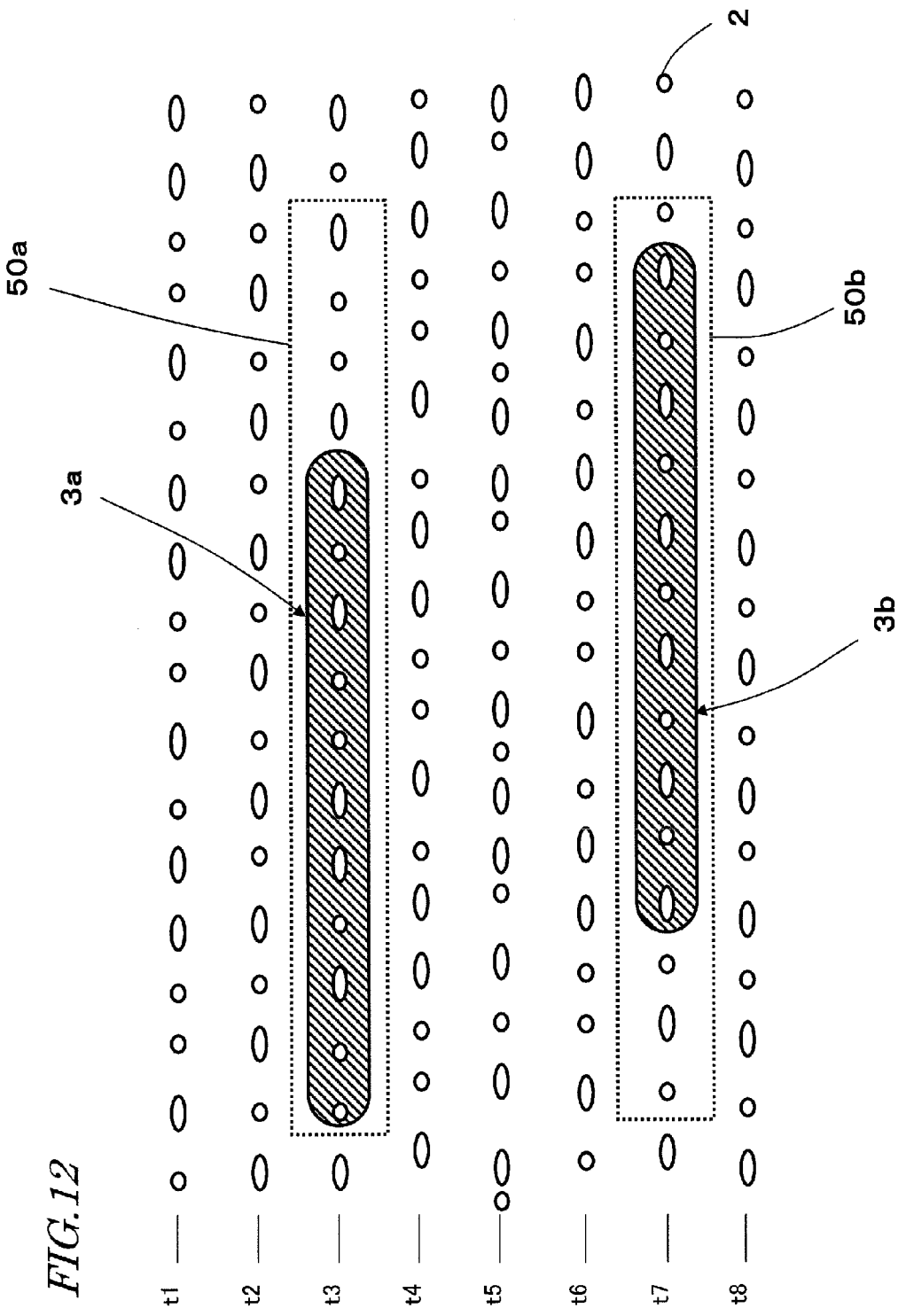
FIG. 12 illustrates where recorded marks may be located on an optical disc in an embodiment in which a recorded mark overlaps with a lot of pre-pits.

Optionally, the present invention is also applicable to an optical disc that is designed so that each recorded mark 3 overlaps with a lot of pre-pits 2. FIG. 12 illustrates where the marks 3 may be recorded on an optical disc with such a structure. In the example illustrated in FIG. 12, the system controller 505 adjusts the locations of the recorded marks 3 so as to prevent a mark 3 recorded on one track from affecting any other mark 3 recorded on an adjacent track. Specifically, in FIG. 12, a first mark 3*a* has been recorded on a track t7 and a second mark 3*b* has been recorded on a track t3. Also, in FIG. 11, the areas 50*a* and 50*b* indicated by the dotted lines are recordable areas. The marks 3*a* and 3*b* have been recorded in the recordable areas 50*a* and 50*b*, respectively, which are defined to be shorter than the pre-pit reading areas (not shown).

In the example illustrated in FIG. 12, the lengths of the recorded marks 3 as measured along the tracks are defined so that each of those recorded marks 3 overlaps with at least ten pre-pits 2. The length of each recorded mark 3 is at least 10 times, and preferably 50 or more times, as long as the shortest length of the pre-pits 2. For example, if the pre-pits 2 represent data that has been modulated by 1-7 modulation and if the length of one channel clock period is represented by T, the pre-pits 2 may have a minimum length of 2 T and a maximum length of 8 T. On the other hand, the lengths of the recorded marks 3 may be set to be 80 T or more, for example.

By adopting such a configuration, a signal representing the pre-pits 2 and a signal representing the recorded mark 3, which are both included in the RF signal representing the light that has been reflected from the optical disc 1, can be separated more easily. The RF signal can be split into those two signals using a band-pass filter, for example.

In a situation where such a long mark 3 has been recorded to overlap with a lot of pre-pits 2, if no pre-pit signal can be obtained anymore from an area irradiated with the writing light beam that has been used for recording the mark 3, no tracking error signal can be generated any longer using those pre-pits 2. And the longer the recorded mark 3, the longer the period of time for which no tracking control can get done. However, such a problem can be overcome by determining the lengths of the recorded marks 3 within an appropriate range. According to the present invention, the recorded marks 3 can be at most equal to, and usually shorter than, the recordable areas that are shorter than the pre-pit reading areas. As a result, the tracking control can get done with stability on the areas on which the marks 3 have been recorded.

The present invention is applicable for use in an optical disc drive that can write information on a given optical disc and in various types of electronic devices with such an optical disc drive built in.

What is claimed is:

1. An optical disc drive for writing information on an optical disc, the disc including a substrate on which a number of pre-pits have been formed on its tracks and a recording film that is supported on the substrate, wherein the optical disc drive comprises an optical pickup, and a writing control section for instructing the optical pickup to record marks on the tracks by irradiating the recording film with a writing light beam, wherein in accordance with information that defines, on the tracks, recordable areas where the marks are recordable and pre-pit reading areas where no marks are recordable, the writing control section controls the optical pickup to record the marks on at least some of the recordable areas, and wherein on the tracks on which the marks are recorded, each said recordable area is shorter than any of the pre-pit reading areas.

2. The optical disc drive of claim 1, further comprising a memory, in which the information that defines the recordable areas and the pre-pit reading areas is stored.

3. The optical disc drive of claim 1, wherein the recordable areas are defined to overlap with some pre-pits.

4. The optical disc drive of claim 1, wherein on the tracks of the optical disc, an area with pre-pits alternates with an area with no pre-pits, and wherein the recordable areas are defined in the areas with no pre-pits.

5. The optical disc drive of claim 4, wherein the writing control section instructs the optical pickup to record marks on the areas with no pre-pits.

6. The optical disc drive of claim 4, wherein the writing control section makes the optical pickup record the marks so that a signal representing the pre-pits and a signal representing the recorded marks fall within the same frequency range.

7. The optical disc drive of claim 4, wherein guide grooves have been made in the areas with no pre-pits on the optical disc.

8. The optical disc drive of claim 1, comprising a tracking control section for performing a tracking control based on the information that is provided by the pre-pits and included in a signal representing reflected light that has been detected by the optical pickup.

9. The optical disc drive of claim 8, wherein while the marks are being recorded, the tracking control section performs a tracking control based on the information that is provided by the pre-pits and included in the signal representing the reflected light that has been detected by the optical pickup.

* * * * *